March 7, 1950 — C. N. RICHARDSON — 2,500,008
AMMONIA SYNTHESIS
Filed July 16, 1947 — 2 Sheets-Sheet 2
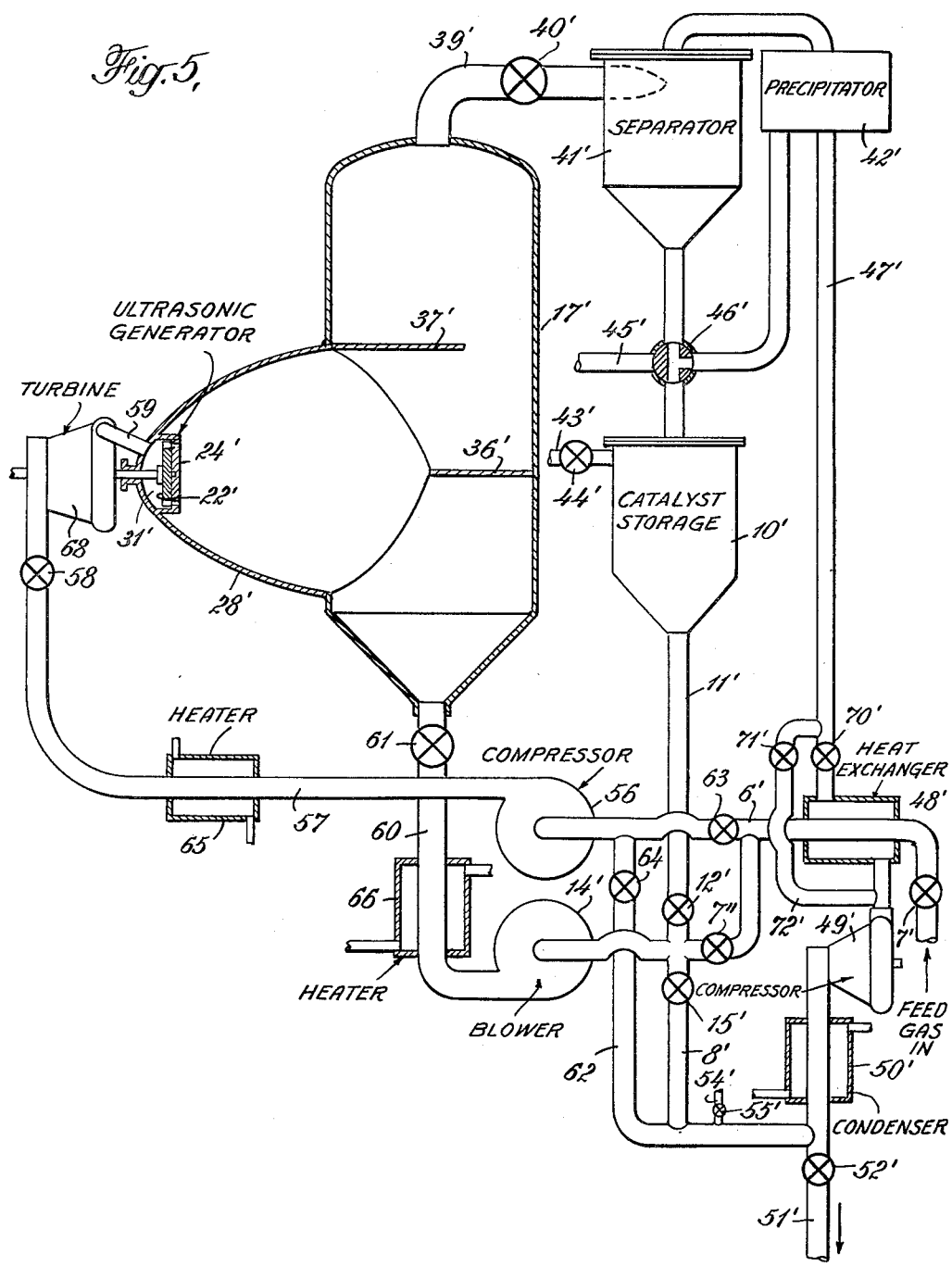
Fig. 5,
INVENTOR
CHESTER N. RICHARDSON
BY
Pennie, Edmonds, Morton & Barrows
ATTORNEYS Patented Mar. 7, 1950

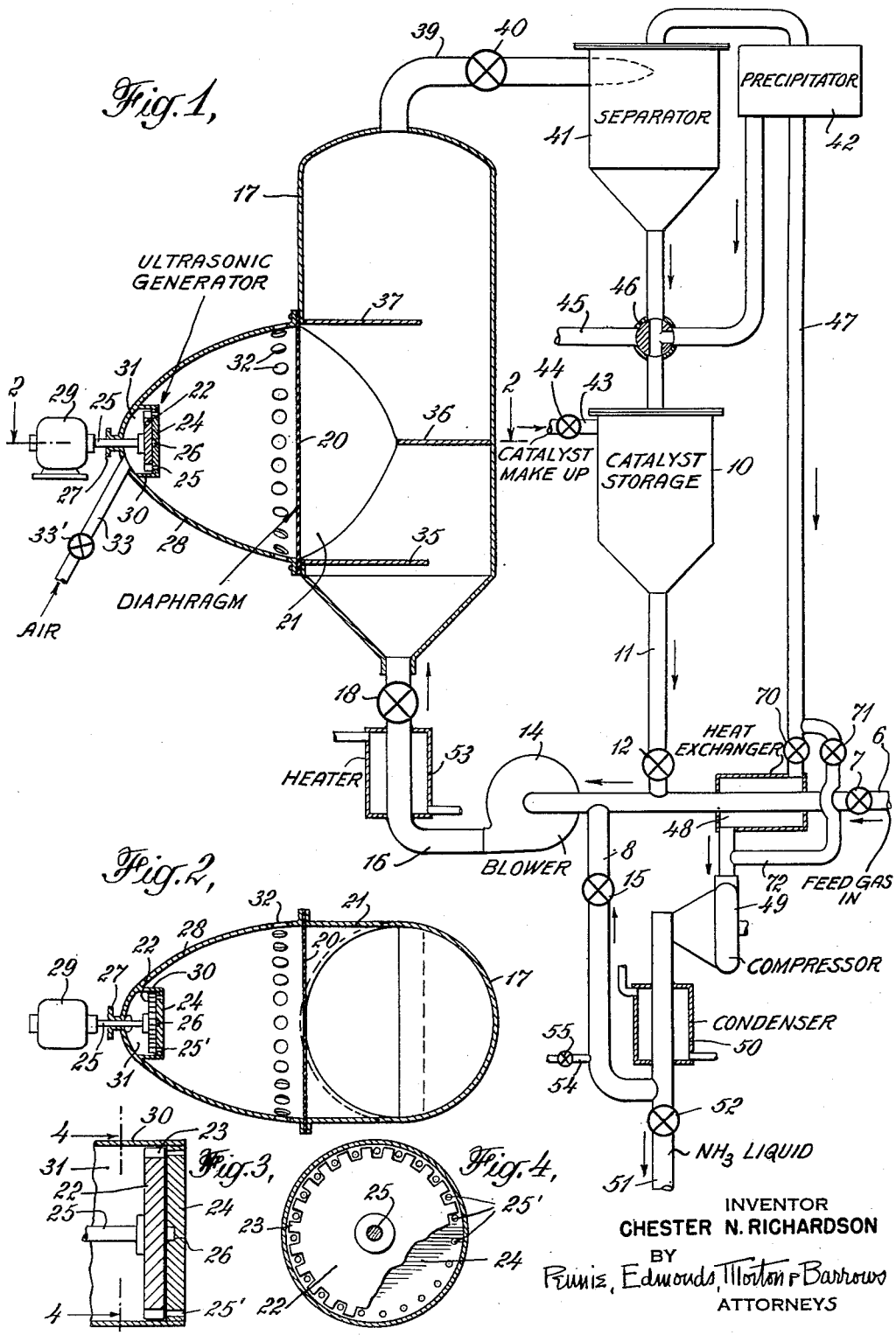

2,500,008

UNITED STATES PATENT OFFICE 2,500,008

AMMONIA SYNTHESIS

Chester N. Richardson, Youngstown, N. Y., assignor to Mathieson Chemical Corporation, a corporation of Virginia Application July 16, 1947, Serial No. 761,256

8 Claims. (Cl. 204—154)

This invention relates to a process for producing ammonia by catalytic synthesis, and more particularly concerns a process of this nature in which the reaction is promoted by subjecting the gases to be reacted in the presence of a catalyst to vibrations at ultrasonic frequency.

Ammonia has heretofore been synthesized from a gas containing considerable proportions of nitrogen and hydrogen in the presence of a fixed catalyst bed. This synthesis has previously been effectively carried out only under relatively high pressures and temperatures. Typical operations require a pressure of from 50 to 1000 atmospheres absolute, and temperatures of the order of 400° to 500° C. For an effective operation, large quantities of the reaction gases must be handled at a relatively high space velocity and this fact coupled with the temperature and pressure requirements necessitate the use of costly reaction vessels and related equipment. Furthermore, the equipment must be inspected and serviced at frequent intervals to insure against leakage and other failures. Due to the small molecular size of hydrogen, special dense metals or alloys must be employed in the reaction vessels particularly when operating under the high pressures indicated.

I have discovered a process by which the catalytic synthesis of ammonia can be effected at relatively low superatmospheric pressures, i. e. pressures not substantially exceeding 10 atmospheres, and even at atmospheric pressure, and by which the temperature of the reaction can be considerably reduced. By the use of my process, the initial and maintenance costs of the reaction apparatus can be materially reduced with consequent significant savings in the cost of producing ammonia.

My process generally involves contacting the reaction gases to be synthesized, essentially hydrogen and nitrogen, with a suitable catalyst having a particle size permitting of its suspension in the gases, and subjecting the reaction gases and suspended catalyst to ultrasonic vibrations. I believe that as the result of this procedure, both the reaction gas molecules and the catalyst particles oscillate at high frequency induced by the utlrasonic vibrations, and due to the greater inertia of the denser catalyst particles, the amplitude of their oscillation is much smaller than that of the lighter gas molecules, whereby relative movement between the catalyst and the gas molecules is induced. This relative movement may serve to separate the synthesized ammonia from the catalyst and to bring fresh gas molecules in contact therewith, thus promoting the reaction. The invention is not dependent upon the correctness of this explanation of the action.

In addition to permitting operation at relatively low temperatures and pressures and thereby effecting important economies in the equipment and maintenance, my process effects a substantial reduction in the amount of catalyst employed as compared with previously known process of ammonia synthesis.

In describing the invention in detail, reference will be made to the accompanying drawings in which apparatus for carrying out the process has been illustrated. In the drawings:

Fig. 1 is a diagrammatic and simplified elevational representation illustrating one form of apparatus suitable for carrying out my process;

Fig. 2 is a sectional view of the reaction chamber of the apparatus of Fig. 1 taken along the line 2—2 of Fig. 1 and viewed in the direction of the arrows;

Figs. 3 and 4 illustrate in diagrammatic fashion a form of ultrasonic generator for use in my apparatus, Fig. 3 being an enlarged sectional elevation and Fig. 4 being a plan view taken on the line 4—4 of Fig. 3; and Fig. 5 is a diagrammatic and simplified representation, similar to Fig. 1, showing a modified form of apparatus for carrying out my process.

The process of my invention employs as a feed gas a mixture predominantly comprising nitrogen and hydrogen, and this feed gas may be the same as that used in conventional ammonia synthesis. The gaseous mixture is freed from catalyst poisons and otherwise purified by conventional and known procedures and is delivered to the apparatus through the duct 6 under control of the valve 7. The gas thus fed usually contains the reaction gases in the approximate proportions of three volumes of hydrogen to one volume of nitrogen, although larger proportions of hydrogen may be desirable and may be used in some cases.

I prefer to employ catalysts known in the art to be useful for ammonia synthesis by conventional procedures. Iron catalysts are suitable and particularly such catalysts containing added promoters. Doubly promoted iron catalysts carrying an alkali oxide such as potassium oxide and another difficultly reducible metal oxide, as aluminum oxide, are particularly useful and are preferred. Such catalysts may be prepared by burning iron in an atmosphere of oxygen to form iron oxide ($Fe_3O_4$), fusing the oxide, dissolving the promoters therein, cooling the melt and crushing, and then reducing the iron oxide with reaction gas in the reaction zone of the ammonia synthesis system. In the crushing operation, the oxide mixture, as previously indicated, should be converted to such a finely divided state that the particles can be suspended in the flowing reaction gas mixture. The parfrom about 5 to about 200 microns, although larger and smaller particles may be used and are generally present in minor proportions.

The finely divided catalyst flows from a storage chamber 10 through a pipe 11 under control of a valve 12 and is introduced with feed gas from the pipe 6 together with recycled reaction gas from the pipe 8 to the intake of a blower 14. The relative proportion of feed gas, recycled gas and catalyst is regulated by adjustment of the valves 7, 12 and 15. The finely divided catalyst is thoroughly mixed with and suspended in the reaction gas mixture in the blower 14. The amount of catalyst suspended in the reaction gas mixture may be widely varied and may comprise from about 10 to 1000 pounds of catalyst per 1000 cubic feet of gas. When using a doubly promoted catalyst of the type described, about 100 pounds of catalyst per 1000 cubic feet of gas is a satisfactory proportion. The relative proportion of feed gas and recycled gas is not critical since both of these gases comprise in the main hydrogen and nitrogen in the ratio of approximately 3 to 1. From the blower 14, the gas and catalyst mixture flows through the pipe 16 into the reaction vessel 17.

The velocity of the gas in the reaction chamber is adjusted to maintain the catalyst suspended in the reaction zone without blowing excessive quantities of catalyst out of the reaction vessel and without permitting undesirable settling of the catalyst. This velocity varies with the particle size of the catalyst. With a catalyst having an average particle size of about 200 microns, the linear velocity of the gas preferably does not exceed about 350 feet per minute, and may be about 300 feet per minute. With smaller catalyst particle sizes, lower gas velocities may be used. With an average catalyst particle size of about 100 microns, a linear gas velocity of about 90 feet per minute is satisfactory. The pressure in the reaction zone may be maintained at a low superatmospheric value and generally is kept between one and twenty atmospheres.

The reaction vessel 17 may take various forms and in the disclosed embodiment comprises a vertical substantially cylindrical chamber designed and constructed of materials that will withstand the effects of ultrasonic waves without loss of strength or stability. The size of the chamber formed by the vessel 17 is preferably such as to maintain the reaction gas and catalyst in contact therein while under the influence of the ultrasonic waves for an interval of about 0.1 to 10 seconds or more. A suitable contact of time is about 4 seconds. In the reaction vessel 17 shown, the gas and catalyst mixture is blown into a conical section at the lower end of the vessel and passes upwardly therethrough, this flow assisting in suspending the catalyst in the gases at the reaction zone. The particular shape of the reaction vessels shown is not critical and various horizontal or vertical cylindrical or conical structures may be used. Furthermore, the gas and catalyst mixture may be introduced tangentially to a cylindrical or conical vessel if desired.

In the form of apparatus illustrated in Figs. 1 and 2, a considerable area of the wall of the reaction vessel 17 comprises a flexible diaphragm 20 which may be secured across the end of a lateral extension 21 of the cylindrical wall of the vessel as shown in Fig. 2. The diaphragm 20 is formed of a material which is relatively non-absorbent of ultrasonic energy and is made as thin as possible consistent with effective closure of the reaction vessel. Since the reaction is carried on at relatively low superatmospheric pressures or even at atmospheric pressure, extremely thin and light diaphragms may be used. Suitable materials for forming the diaphragm 20 include plastics and metal alloys such as silicon bronze, beryllium bronze and aluminum bronze. The diaphragm may be from about one to thirty thousandths of an inch thick, and a suitable thickness is about five thousandths of an inch.

Vibratory waves of ultrasonic frequency are propagated through the diaphragm 20 into the reaction gases carrying the finely divided catalyst within the vessel 17. Various known forms of generators may be employed to produce such high frequency waves, but it is preferred to employ a wave generator of a type having a relatively high energy output of the order of 5 to 500 kilowatts or more. An output of 150 kilowatts is satisfactory. The generator illustrated, and which is also shown in Figs. 3 and 4, comprises essentially a disk shaped rotor 22 having a plurality of equally spaced substantially square teeth 23 cut in its periphery and a cooperating stator 24 having a like number of similarly spaced circumferentially aligned holes 25' therethrough adjacent its periphery. The rotor is carried on a shaft 25 suitably journaled in a bearing 26 in the stator and a bearing 27 extending through a reflector 28. The rotor teeth 23 are disposed to overlap the stator holes 25' so that the holes are periodically opened and closed as the rotor rotates to produce rapid pulses in columns of air or gas forced through the holes, the action being similar to that in a siren. The rotor 22 and stator 24 are closely spaced, having a clearance therebetween which may be as small as one thousandth of an inch, and the rotor is driven at a high speed such as 8,000 to 10,000 revolutions per minute or more by suitable means illustrated as a motor 29 in Fig. 1. A casing 30 extends from the stator 24 around the periphery of the rotor 22 and is connected to the reflector 28 to form a chamber 31 behind the rotor into which compressed air or other gas is fed from a pipe 33 under control of a valve 33'. The air or gas passed through the generator is preferably supplied to the chamber 31 under a pressure which may be of the order of thirty pounds per square inch above the pressure within the reflector 28 on the downstream side of the generator.

The reflector 28 is preferably of parabolic form, and the generator unit comprising the rotor 22 and stator 24 is placed as nearly as possible at the focal point of the reflector so that the generated waves are focused in generally parallel beams through the diaphram 20 and into the reaction zone within the vessel 17. Openings 32 are provided adjacent the rim of the reflector 28 to permit the escape of air or gas passed through the generator. The reflector 28 is suitably secured to the reaction vessel 17 over the diaphragm 20. The number of rotor teeth and stator holes is so related to the speed range within which the rotor is driven that ultrasonic waves having frequencies above twenty thousand cycles per second are generated. I prefer to employ a generator capable of producing frequencies of from about forty thousand and to sixty thousand cycles per second when operated at the speeds previously indicated. Although the type of ultrasonic generator described is satisfactory, other forms of generators capable of producing ultrasonic waves of frequencies within the stated range may be employed. Any suitable generator will, of course, contain a greater number of rotor teeth and stator holes than is practicable to show in the drawings.

The reaction vessel may be equipped with baffles to prevent short circuiting of the gas mixture passing therethrough, and baffles 35, 36 and 37 have been illustrated for this purpose. These baffles are arranged parallel to the direction of projection of high frequency waves and do not contact the diaphragm 20.

The effluent from the reaction vessel, which comprises a mixture of synthesized ammonia and unreacted hydrogen and nitrogen carrying some entrained catalyst passes out through the pipe 39 having placed therein valve 40 at the top of the vessel 17 and the catalyst carried in this effluent is separated therefrom by suitable means such as a centrifugal separator 41 and an electrostatic precipitator 42, both of known construction. Either the centrifugal separator or the precipitator may be dispensed with if the particle size and quantity of catalyst carried in the effluent gas mixture permits this simplification. The separated catalyst is collected in the catalyst storage chamber 10, to which fresh activated catalyst for makeup can be supplied through a pipe 43 under control of a valve 44. Ordinarily the separated catalyst requires no reactivation, and can be reintroduced directly into the system, but the catalyst can be removed, reactivated and replaced if necessary or desirable. If the catalyst removed from the effluent gas mixture contains an excessive amount of fines, it may be discarded from the system through the pipe 45 under control of the valve 46.

The effluent gases freed from catalysts leave the precipitator through a pipe 47. Due to the exothermic nature of the catalytic reaction, these gases carry considerable heat which may be employed to raise the temperature of the feed gas mixture to that required to maintain the reaction, and a heat exchanger 48 is employed for this purpose. The amount of heat so supplied to the feed gas may be regulated by adjustment of the valves 70 and 71 which govern the amount of hot gas by-passed around the heat exchanger 48 through the pipe 72.

The synthesized ammonia may be removed from the effluent gases in any suitable known fashion, as by condensation or by absorbents such as water or silica gel. Where water is used, it is necessary to dry the gas from which the ammonia has been removed before returning this gas to the reaction zone. For the purpose of illustration, I have here shown a compressor 49 and a condenser 50 for liquefying the ammonia and so removing it from the unreacted gas mixture, the ammonia being discharged from the system through a pipe 51 under control of the value 52. The unreacted gases are returned to the system through the pipe 8. Uncondensible gases may be periodically purged from the recycled gas stream, and a purge pipe 54 having a valve 55 therein has been shown for this purpose.

In starting up the reaction according to my process, it is necessary to supply heat to the reaction gas mixture. This may be accomplished by employing a suitable heater illustrated at 53 and arranged to heat the gas mixture in the pipe 16 leading to the reaction vessel 17. The temperature of the reaction may be maintained at the desired value, generally between about 100 and 325° C. and preferably between about 100° and 200° C., by regulating the rate at which heat is supplied to the feed gas in the heat exchanger 48.

In some cases it is advantageous to generate the waves of ultrasonic frequency directly in a portion of the reaction gas mixture fed into the reaction vessel, thus dispensing with the use of a diaphragm in the reaction vessel wall. Apparatus operating in this fashion has been illustrated in Fig. 5. As there shown, the reaction vessel 17' includes a substantially parabolic reflector 28' forming a part of the wall thereof, and an ultrasonic generator comprising a rotor 22' and a stator 24' of the type described above is disposed substantially at the focus of the reflector. The rotor 22' is advantageously driven by a turbine 68 which employs as a motive fluid a part of the reaction gas mixture which has been compressed in a compressor 56 and delivered to the turbine through the pipe 57 under control of a valve 58. The exhaust gas from the turbine passes through a duct 59 into the chamber 31' behind the rotor 21' and from this chamber passes out through the stator openings in rapid pulses interrupted by the rotating rotor teeth of the rotor.

The gas mixture employed to drive the turbine 68 and thereafter acted on by the generator to form the ultrasonic vibratory waves preferably comprises recycled reaction gas and fresh makeup gas free from suspended catalyst. A separate charge of reaction gas carrying the suspended catalyst is introduced into the reaction vessel 17 through a pipe 60 under control of a valve 61. The catalyst from the storage chamber 10' is mixed with fresh reaction gas from the pipe 6' and recycled gas from the pipe 8' at the inlet of the blower 14', the proportions of gas and catalysts being regulated by the valves 7'', 12' and 15'. Fresh feed gas and recycled gas are also supplied to the compressor 56 from the pipes 6' and 62 under control of the valves 63 and 64. The catalyst free influent gas mixture may be heated for starting purposes by a heater 65, and the influent reaction gas carrying catalyst may be heated for this purpose by a heater 66. The apparatus for recovering the catalyst carried out of the reaction vessel 17' and that for removing synthesized ammonia from the effluent reaction gases is the same as that described above in connection with the apparatus of Fig. 1, and the corresponding elements of this apparatus in Fig. 5 are designated by like reference characters having distinctive exponents.

With the described arrangement as illustrated in Fig. 5, the influent reaction gas serves as a carrier for the ultrasonic vibrations produced in the generator, and another portion of the reaction gas bearing the catalyst in suspension is mixed with the vibrating portion within the reaction vessel 17'.

The following are examples of the operation of my process:

*Example I*

Using the type of apparatus illustrated in Figs. 1 and 2, a gas mixture comprising predominantly hydrogen and nitrogen in the proportion of three to one and made up of feed gas and recycled gas containing minor amounts of synthesized ammonia is supplied to the reaction vessel through the blower 14. Finely divided doubly promoted iron catalyst of a particle size such that about 50% thereof consisted of particles having diameters between 50 and 200 microns is also supplied to the blower and mixed with the influent gas in a proportion of approximately 100 pounds of catalyst to 1,000 cubic feet of gas. The gas and catalyst mixture is initially heated by the starting heater 53 to about 150° C. as it enters the reaction vessel 17, but the auxiliary heat is discontinued as soon as the reaction temperature increases to within approximately 10° of 150° C. This temperature is thereafter maintained by adjustment of the heat supplied to the feed gas in the heat exchanger 48. The pressure in the reaction zone is of the order of 1½–2 atmospheres. The ultrasonic generator is operated to propagate vibratory wave energy in the reaction zone at a frequency of about fifty thousand cycles per second. After separation of entrained catalyst, synthesized ammonia is condensed from the effluent reaction gas, and this gas is recycled in the system. In this operation, the yield of ammonia amounts to about 29% per pass based on the nitrogen and hydrogen charged.

*Example II*

Using the apparatus illustrated in Fig. 5, a portion of the reaction gas mixture is compressed to about 60 pounds per square inch in the compressor 56 and passed through the generator driving turbine 68. The exhaust gas from the turbine at about 35 pounds per square inch is forced through the generator and into the reaction vessel 17'. The generator is operated to produce vibratory wave energy of a frequency of about thirty-five thousand cycles per second. A second portion of the reaction gas carrying in suspension therein finely divided catalyst is introduced to the reaction vessel from the blower 14'. The reaction is started by auxiliary heat supplied to both influent gas streams, and is thereafter maintained by adjustment of the heat exchange between the catalyst freed effluent gas and the makeup feed gas. The temperature of the reaction is maintained at about 150° C. and the pressure is at or slightly above atmospheric pressure. In this operation, the yield of ammonia amounts to about 32% per pass based on the nitrogen and hydrogen charged.

I claim:

1. A process for the synthesis of ammonia from its constituent elements which comprises subjecting a gaseous mixture of nitrogen and hydrogen carrying a finely divided catalyst in suspension therein to ultrasonic vibrations of a frequency greater than twenty thousand cycles per second.

2. A process for the synthesis of ammonia from its constituent elements which comprises suspending a finely divided catalyst in a gaseous stream comprising essentially nitrogen and hydrogen, and then subjecting such stream to the action of ultrasonic vibrations of a frequency greater than twenty thousand cycles per second at a temperature between about 100° C. and 325° C.

3. A process for the synthesis of ammonia from its constituent elements which comprises suspending a finely divided promoted iron catalyst in a gaseous stream comprising essentially nitrogen and hydrogen and then subjecting such stream to the action of ultrasonic vibrations of a frequency greater than twenty thousand cycles per second while maintaining the stream at a temperature between about 100° C. and 200° C. and at substantially atmospheric pressure.

4. A process for the synthesis of ammonia from its constituent elements which comprises suspending a finely divided promoted iron catalyst in a gaseous stream comprising essentially nitrogen and hydrogen and then subjecting such stream to the action of ultrasonic vibrations of a frequency greater than twenty thousand cycles per second while maintaining the stream at a temperature between about 100° C. and 200° C. and at a superatmospheric pressure not substantially exceeding ten atmospheres.

5. A process for the synthesis of ammonia from its constituent elements which comprises suspending a finely divided promoted iron catalyst of an average particle size not exceeding about 200 microns in a gaseous stream comprising essentially nitrogen and hydrogen, and then subjecting such catalyst carrying gaseous stream to the action of ultrasonic vibrations of a frequency between about thirty thousand and about forty thousand cycles per second while at a temperature between about 100° and 200° C. and at a superatmospheric pressure not substantially exceeding ten atmospheres.

6. A process for the synthesis of ammonia from its constituent elements which comprises suspending a finely divided promoted iron catalyst of an average particle size not exceeding about 200 microns in a gaseous stream comprising essentially nitrogen and hydrogen in the proportion of from ten to one thousand pounds of catalyst per thousand cubic feet of gas, and then subjecting such catalyst carrying gaseous stream to the action of ultrasonic vibrations of a frequency between about thirty thousand and about forty thousand cycles per second while at a temperature between about 100° and 200° C. and at a superatmospheric pressure not substantially exceeding ten atmospheres.

7. A process for the synthesis of ammonia from its constituent elements which comprises suspending a finely divided promoted iron catalyst in a gaseous stream comprising essentially nitrogen and hydrogen, imposing upon another gaseous stream of nitrogen and hydrogen ultrasonic vibrations of a frequency greater than twenty thousand cycles per second and mixing such gaseous streams at a temperature between about 100° and 325° C. and under a superatmospheric pressure not substantially exceeding ten atmospheres.

8. A process for the synthesis of ammonia from its constituent elements which comprises suspending a finely divided promoted iron catalyst of an average particle size not exceeding about 200 microns in a gaseous stream comprising essentially nitrogen and hydrogen, imposing upon another gaseous stream of nitrogen and hydrogen ultrasonic vibrations of a frequency between thirty thousand and forty thousand cycles per second and mixing such gaseous streams at a temperature between about 100° and 200° C. and under a superatmospheric pressure not substantially exceeding ten atmospheres.

CHESTER N. RICHARDSON.

REFERENCES CITED

The following references are of record in the file of this patent:

UNITED STATES PATENTS

| Number | Name | Date |
|---|---|---|
| 1,077,034 | Bosch | Oct. 28, 1913 |
| 1,313,314 | Metzger | Aug. 19, 1919 |
| 1,313,316 | Metzger | Aug. 19, 1919 |

FOREIGN PATENTS

| Number | Country | Date |
|---|---|---|
| 274,904 | Great Britain | May 17, 1928 |

OTHER REFERENCES

Chemical Abstracts, vol. 34, page 8189 (1940).